Figure 5:
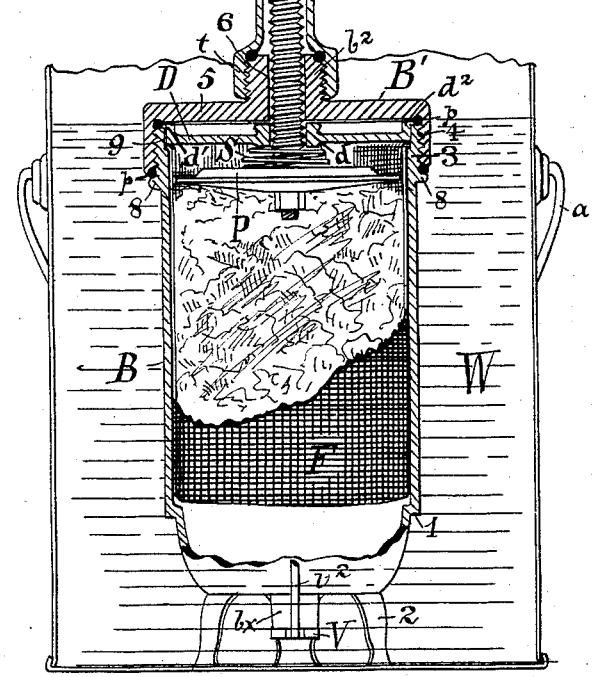

(No Model.) 2 Sheets—Sheet 1.
I. GILES.
APPARATUS FOR MAKING EXTRACTS.
No. 417,168. Patented Dec. 10, 1889.
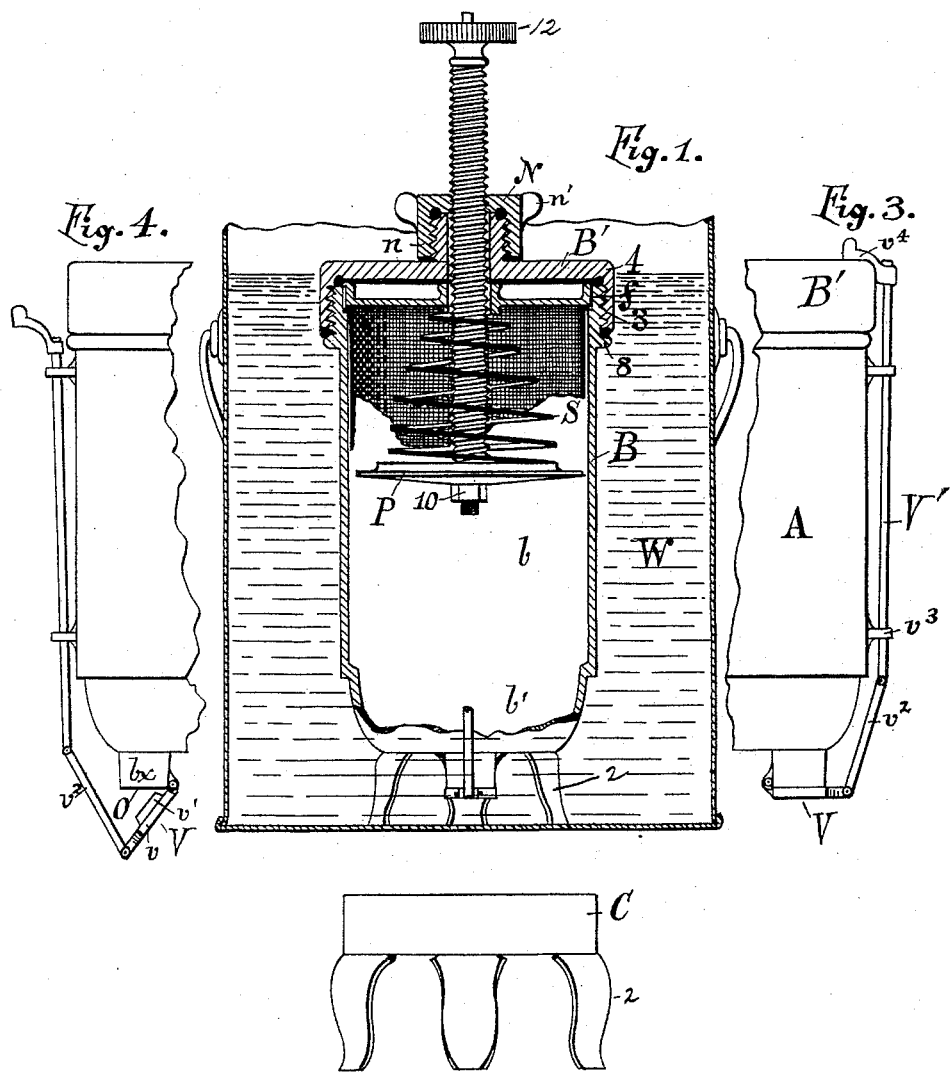
Witnesses:
Inventor:
Isaac Giles
by Lewis Abraham
Attorney (No Model.) 2 Sheets—Sheet 2.

I. GILES.
APPARATUS FOR MAKING EXTRACTS.

No. 417,168. Patented Dec. 10, 1889.

Witnesses:
Edw. E. Clement
Saml. H. Jacobson

Inventor:
Isaac Giles
by Lewis Abraham
Attorney

UNITED STATES PATENT OFFICE.

ISAAC GILES, OF NEW YORK, N. Y.

APPARATUS FOR MAKING EXTRACTS.

SPECIFICATION forming part of Letters Patent No. 417,168, dated December 10, 1889.

Application filed February 20, 1889. Serial No. 300,576. (No model.)

*To all whom it may concern:*

Be it known that I, ISAAC GILES, a citizen of the United States, residing at New York, in the county of New York and State of New York, have invented a new and useful Improvement in Extracting Utensils, of which the following is a specification.

My invention has principal reference to means for extracting juices from meats.

In carrying out my purpose I provide a vessel which, when supplied with the necessary quantity of material, is hermetically closed. The contents of said vessel are by suitable mechanism subjected to a continuous gradual pressure when brought under the influence of heat.

My invention consists of certain novel forms of construction and in combinations thereof, as hereinafter fully described, illustrated in the drawings, and specifically pointed out in the claims.

Figure 6:
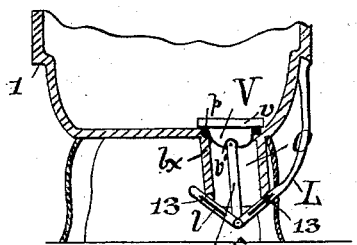
Figure 7:
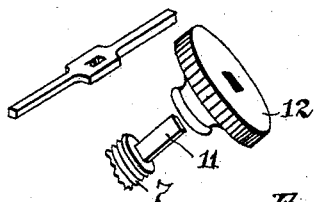

Referring to the accompanying drawings, wherein like letters of reference point out similar parts on each figure, Figure 1 is a sectional view of an apparatus embodying my invention, parts being broken away and showing the pressure-spring distended. Fig. 2 represents a stand for reception of the extracting-vessel when removed from its inclosure. Fig. 3 is a partial section of the extracting-vessel, showing the discharge-valve closed and means for operating said valve. Fig. 4 is a like view showing the valve open. Fig. 5 is a sectional view of the apparatus, the pressure-plate being drawn upwardly, its operating-spring compressed, the vertical threaded shaft being elevated and covered by a tubular cap, the screw set-nut shown in Fig. 1 being removed. Said view also shows an interior foraminous cup for holding material to be treated according to my invention. Fig. 6 is a detail view showing modified form of the discharge-valve. Fig. 7 is a detail view of the upper end of the screw-threaded shaft and a detachable milled head. Said figure also shows means for turning said shaft by dispensing with the milled head and employment in its stead of a key-bar that can be temporarily adjusted on said shaft.

In the drawings, A is an ordinary boiler provided with an ordinary bail $a$, which may be of any desired shape or size. The drawings show only a portion of its height. In practice it should be sufficiently large to contain the extracting-vessel and admit of its being entirely covered over.

B is the extracting-vessel. It consists of a chamber $b$, having a lower extension $b'$, preferably of smaller diameter, reaching from a circumferential offset 1, and is supplied with feet 2 to keep it elevated above the bottom of the boiler A when inserted therein.

C is a stand upon which to rest the extracting-vessel when removed from the boiler. The upper end of the vessel B is circumferentially screw-threaded on its outer surface, as shown at 3, to mesh with the screw-thread of the collar 4 of the main cover B'. Said cover is composed of a flat plate 5, having downwardly-overturned collar 4, and has extending upwardly from its center a short stud $b^2$, provided with a smooth bore or central orifice 6, for the free passage therethrough of a vertical screw-threaded shaft 7, particularly presently described.

The stud $b^2$ is outwardly screw-threaded for the reception of a removable set-nut N and the lower end of a tubular cover T. Below the screw-thread 3 is an outwardly-extending bead 8, upon which the lower end of the collar 4 rests when screwed home, and which serves as a complete closure for that portion of the device.

Before the cover B' is adjusted in place the chamber $b$ is covered with a plate D, having a central upturned disk $d$, provided with a smooth-bored orifice, which, when said plate lies over the chamber $b$, is coincident with the orifice 6 of the main cover B', the two orifices composing aligning openings for the free passage of the shaft 7. Said disk $d$ also serves the purpose of a handle for facilitating the adjustment and removal of the plate D. Surrounding the plate D is an upturned flange $d'$, which is returned at right angles thereto to compose a peripheral rim $d^2$. At the inner surface of the upper end of the vessel B is a circumferential recess 9, within which the flange $d'$ snugly fits, the overturned rim $d^2$ resting upon the upper edge of the vessel B, as plainly shown in Figs. 1 and 5.

Suitable yielding gaskets or bushings $p$ are placed at all locations where the various removable members of the device are conjoined, which serve the purpose of making all joints air-tight.

P is an imperforate pressure-plate, herein called a "follower," to which is connected by a nut 10 a vertical screw-threaded shaft 7. Said follower, by means of a convolute spring, is caused to move gradually within the device as the bulk of the contents of the foraminous cup is reduced under treatment, hereinafter specifically described.

The shaft is provided at its upper end with a square post 11, onto which takes a removable milled disk 12, and it will be readily understood that said shaft can be turned by means of said head-disk within the threaded opening of the set-nut N; but the milled head may be dispensed with and the shaft turned by means of a bar having a slot that will fit upon the squared post of the shaft, as shown in Fig. 7.

The stud $b^2$, as before described, is a screw-threaded outwardly. N is a set-nut having central threaded bore, which, when in place, as shown in Fig. 1, lies in alignment with the orifices of the cover B' and plate D. Said nut is hollowed out at its under portion, and its depending circumferential flange $n$ is supplied with a female screw-thread of size and pitch to take onto the male screw of the stud $b^2$. The nut N is further supplied with ears $n'$, common to analogous devices, to facilitate its connection to and removal from the stud $b^2$.

S is a spiral spring, the lower coil of which is connected to the follower P, the upper coil being fastened to the under side of the plate D near its center. It will be seen by the drawings that the convolutions of said spring increase in size at each turn from the upper to the lower one, the object being that when it is retracted, as illustrated in Fig. 5, it will lie between the follower and plate D, practically as a volute, enabling said follower and plate to be brought close to each other.

T is a smooth-bored tubular cover for the outwardly-extending screw-threaded shaft 7. Its lower end has an enlargement $t$, which is internally supplied with a female screw that meshes with the male thread of the stud $b^2$. The milled head being removed from the squared post of the shaft 7, the tubular cover is passed over said shaft and its lower enlargement is screwed onto the stud $b^2$, whereby to compose a complete air-seal, to prevent ingress or egress of vapor, steam, or atmosphere, which would otherwise flow through the interstitial spaces of the thread upon the shaft 7.

V is a valve to open and close the eduction-opening O of the lower extension $b'$. It consists of a disk-plate $v$, having a central plug $v'$, preferably composed of cork or any yielding substance, surrounded by a ring-packing $p$. Said valve-plate is hinged to a tubular extension $b^{\times}$ of the lower end $b'$ of the chamber $b$, its opposite end being pivotally connected by a link $v^2$ to a rod V', which passes through eyes or staples $v^3$, attached to the outside of the extracting-vessel B. The upper end of the rod V' is furnished with a swinging handle $v^4$, adapted to turn over the top of the cover B', as shown in Fig. 3, whereby the valve-plug is securely held within its seat.

Fig. 6 shows a modified form of valve, wherein the position of the seat and plug are respectively reversed. In this modification the valve is operated through a short rod $v^5$, pivotally connected to the plug, its opposite end being pivoted to a lever-arm L and a short link $l$, the arm and link being each provided with an elongated slot, through which is passed a studded pin 13, reaching outwardly from the tubular extension $b^{\times}$ of the lower chamber $b'$. By raising or depressing the lever L the valve-plug will be seated in or removed from the upper opening of the tubular extension $b^{\times}$.

The plate and plug will be maintained in the position shown in Fig. 6 by pressure of the contents of the extracting-vessel; but for further security and to obviate all risk of its being displaced by ebullition of the water W within the boiler A, I prefer that the lever-arm shall be bent, so that its upper end will lie under the shoulder of the offset 1, which will act as a detent. Thus far I have confined the description to the apparatus shown in Fig. 1. It is, however, my intention to have depending therein a removable foraminous cup or basket F, preferably made of open-meshed wire having an upper peripheral flange $f$, that will fit the shoulder of the recess 9 at the upper inner portion of the chamber $b$, and, as will be seen in Fig. 1, the flange $f$ will be held down by the cap D when the device is closed.

From the foregoing description, in connection with the drawings, the nature and object of my invention and its operation will be readily understood by all familiar with analogous apparatus.

The improvement consists in the provision of means whereby the juices of material may be thoroughly and effectually extracted within a vessel hermetically closed.

Its operation may be thus described: The set-nut is screwed on the stud of the cover B' and the shaft 7 screwed within the threaded orifice of said nut. It is then passed successively through the smooth orifices of the cover B' and plate D, and the lower end of said shaft is keyed to the follower P by nut 10. The shaft is then turned upwardly until the follower and plate D are drawn closely together, thereby compressing the intermediate spring S practically into a volute, as illustrated in Fig. 5. The foraminous cup F, being supplied with the material to be decocted, is inserted within the vessel B, the flange $f$ keeping said cup suspended, thereby leaving an unobstructed lower extension $b'$ for fluid as extracted. As before set forth, the lower extension $b'$ is diametrically smaller than the main portion of the chamber $b$, the bottom of the foraminous cup reaching to and resting upon the offset 1. The vessel B is then securely closed by the cover B' and its underlying plate D, the points of juncture of the plate and cover being provided with bushing $p$, to hermetically close all their joints. The milled head disk or shaft operating key is now removed from the post 11, thus admitting the withdrawal of the set-nut, which, when unscrewed from the stud $b^2$, is removed from the shaft 7. The covering-tube T is next screwed onto the stud $b^2$ and all openings left by interstices of the thread of the shaft securely closed thereby. The plug of the valve V is then forced into its seat by means of the rod V' or lever-arm L, as the case may be, and thus all openings and joints of the device are hermetically sealed. The vessel B, supplied, as before set forth, with material within its foraminous cup, is then inserted within a boiler A, supplied with water W, which is placed over a fire and the water allowed to boil. The effect will be to extract the juice or liquid constituent of said material, which will flow into the extension $b'$ of the chamber $b$. The follower P will rest upon the material within the cup F, and as its bulk is decreased by extraction of portions of its elements said follower will continuously gradually press upon the upper surface of said material and assist in extraction of its liquefactions, which will fall into and be deposited within the extension $b'$. It will be understood that when it is desired to remove the extracted fluid from the chamber the whole device is lifted out of the boiler A and the extract is removed by opening the valve V. To facilitate the operation, I have provided a stand C, elevated by feet, (see Fig. 2,) which will admit of a suitable vessel being placed below the valve for reception of the extract as its flows through the opened extension $b^\times$.

Having thus fully described my invention and its operation, what I claim, and desire to secure by Letters Patent, is—

1. An extracting apparatus having a chamber $b$, with a lower extension of smaller diameter, supplied with an internal upper cap D and cover B', provided with depending screw-threaded circumferential flange, said cap and cover having coinciding central smooth-bored orifices for passage of a vertical shaft, in combination with horizontally-aligning follower P, having a coiled spring S intermediate of said plate and follower, as and for the purpose intended, substantially as described.

2. The extracting-vessel B and its cover B', having an uprising orificed stud $b^2$, supplied with removable set-nut N, having a threaded central opening and threaded depending flange $n$, in combination with screw-threaded shaft 7, substantially as described.

3. The combination of an extracting-vessel of the character described with the hinged valve V, provided with closing-plug $v'$, fitting into opening O of extension $b^\times$ at the lower end of the device, said valve being operated through pivoted links by a rod adapted to be secured outside of the vessel, substantially as described.

4. The extracting-vessel B, provided at its upper end with an inner annular recess, in combination with plate D, having an upturned flange fitting in said recess, and foraminous cup F, having flange $f$, substantially as described.

5. An extracting apparatus having a chamber provided with a removable foraminous cup suspended within said chamber and having within said cup a spring-pressed imperforated follower P, in combination with vertical shaft 7, to the lower end of which said follower is attached by holding-nut 10, substantially as described.

ISAAC GILES.

Witnesses:
SAML. H. JACOBSON,
ANSON S. TAYLOR.